(12) United States Patent
Li (10) Patent No.: US 10,962,114 B2
(45) Date of Patent: Mar. 30, 2021

(54) ROLLING PISTON RING, PISTON AND CYLINDER

(71) Applicant: Zhongfu Li, Zhalantun (CN)

(72) Inventor: Zhongfu Li, Zhalantun (CN)

( * ) Notice: Subject to any disclaimer, the term of this patent is extended or adjusted under 35 U.S.C. 154(b) by 74 days.

(21) Appl. No.: 16/389,961

(22) Filed: Apr. 21, 2019

(65) Prior Publication Data
US 2019/0242479 A1 Aug. 8, 2019

(30) Foreign Application Priority Data

Jun. 7, 2018 (CN) .......................... 201810577905.3

(51) Int. Cl.
*F16J 1/02* (2006.01)
(52) U.S. Cl.
CPC ..................................... *F16J 1/02* (2013.01)
(58) Field of Classification Search
CPC . F16J 1/02; F16J 1/00; F16J 1/20; F16J 1/22; F16J 9/00; F16J 15/00; F16J 15/52
USPC ........................................................ 277/310
See application file for complete search history.

(56) References Cited

U.S. PATENT DOCUMENTS

| | | | | |
|---|---|---|---|---|
| 2,201,739 A | * | 5/1940 | Nicholson | F16J 1/02 92/169.1 |
| 2,712,483 A | * | 7/1955 | Ciaccia | F16J 1/02 92/178 |
| 3,327,593 A | * | 6/1967 | Ciaccia | F16J 1/02 92/178 |
| 5,437,220 A | * | 8/1995 | Cheng | F16J 1/02 123/193.6 |

* cited by examiner

*Primary Examiner* — Nathan Cumar

(57) ABSTRACT

A rolling piston installed between a piston and a cylinder includes: a plurality of balls, wherein the balls are connected end to end to form the rolling piston ring, and a quantity of the balls is no less than three; or comprising: a plurality of columns, wherein the columns are connected end to end to form the rolling piston ring, and a quantity of the balls is no less than three; or comprising: balls and columns, wherein the balls and the columns are connected end to end to form the rolling piston ring, and a total quantity of the balls and the columns is no less than three; wherein both the balls and the columns are extendable, and/or a recess on the piston for installing the rolling piston ring is extendable and a slide on the cylinder for installing the rolling piston ring is extendable.

5 Claims, 4 Drawing Sheets

ROLLING PISTON RING, PISTON AND CYLINDER

CROSS REFERENCE OF RELATED APPLICATION

The present invention claims priority under 35 U.S.C. 19(a-d) to CN 201810577905.3, filed Jun. 7, 2018.

BACKGROUND OF THE PRESENT INVENTION

Field of Invention

The present invention relates to a mechanical field which is especially suitable for internal combustion engines, slurry pumps, air compressors, reciprocating impact devices, hydraulic cylinders or cylinders, and more particularly to a rolling piston ring, a corresponding piston and a cylinder.

Description of Related Arts

The friction between the piston ring and the cylinder conventionally installed on the piston is sliding friction. It is known that the rolling friction is much smaller than the sliding friction, but humans have not yet come up with a true rolling piston ring.

Chinese patent applications CN 103291450A and CN 103291602A disclose a piston rolling friction for the purpose of changing the sliding friction between the piston and the cylinder into rolling friction. When the piston ring is not seriously worn, the piston skirt and the inner wall of the cylinder are well lubricated and the pressure is small, wherein the sliding friction is weak. The sliding friction is large between the piston ring and the cylinder wall, wherein the lubrication condition is poor and the pressure is large. These two patents include cylinders, pistons, friction bodies (rolling elements), closing parts, etc., and the sliding friction between the sealing member and the inner wall of the cylinder is still there. The closing part has to seal the piston and the cylinder, which is in great pressure. The great pressure must have a lot of friction, so these two patents changed the original weak sliding friction to rolling friction, but the place with large sliding friction is not changed to rolling friction, which cannot greatly reduce the friction. These two applications do not provide a solution to how to ensure that the rolling element for sealing does not get stuck during thermal expansion, and does not leak oil during thermal contraction.

Chinese application CN 1374447A discloses that a piston ring has a rolling function, which only refers to a special material without implementation scheme diagram. It is conjectured that the application is based on the elasticity of the special material. When the large diameter of the outer side of the piston ring turns to the inner small diameter of the inner side, it is forced by the extrusion deformation, and the extrusion deformation is laborious. Besides, only large extrusion force has a sealing effect in the deformation rolling. Pushing an insufficiently inflated car is more costly than pushing a fully inflated car, because deformation of the insufficiently inflated tire is labor-intensive. Rolling is more labor-saving than sliding, and it takes a lot of effort to deformation. It unclear whether overall effect is labor saving or laborious, and there is no detailed explanation. Our aim is to save effort and the application has not been able to achieve the desired purpose.

There is a need for a labor-saving piston ring that relies on special structures and materials to achieve rolling. The internal combustion engine loses 10% to 25% of the total energy due to friction. The friction between the piston ring and the cylinder accounts for 55%-65% of the total friction of the internal combustion engine. If the sliding friction of the piston ring becomes rolling friction, the friction is reduced to one tenth of the original, in such a manner that the efficiency and power of the internal combustion engine will increase by more than 5%, or the loss will be reduced by at least 5.4%, namely 10%−[10×40%+10×60%×(1/10)]%=5.4%.

SUMMARY OF THE PRESENT INVENTION

For solving the above problems, an object of the present invention is to provide a rolling piston ring, a piston and a cylinder, which relies on the special structure of the piston ring. it can both roll and seal the piston and the cylinder, and when the temperature rises, the piston ring does not get stuck in the cylinder, and when the temperature is lowered, there is no air leakage and oil leakage, so that sliding friction between the piston ring and the cylinder becomes rolling friction, reducing the useless power consumption, improving the efficiency of the heat engine, extending the warranty period, and increasing the service life. There are mature material technologies to improve piston ring strength, wear resistance and heat conduction, which will not described in the present invention. The shape of the rolling piston ring, the piston and the cylinder may be circular, square, and other shapes similar to the shape of the combustion chamber. The three pieces that are put together are similar in shape.

Accordingly, in order to accomplish the above objects, the present invention provides a rolling piston ring installed between a piston and a cylinder, comprising: a plurality of balls, wherein the balls are connected end to end to form the rolling piston ring, and a quantity of the balls is no less than three; or comprising: a plurality of columns, wherein the columns are connected end to end to form the rolling piston ring, and a quantity of the balls is no less than three; or comprising: balls and columns, wherein the balls and the columns are connected end to end to form the rolling piston ring, and a total quantity of the balls and the columns is no less than three; wherein both the balls and the columns are extendable, and/or a recess on the piston for installing the rolling piston ring is extendable and a slide on the cylinder for installing the rolling piston ring is extendable.

Preferably, each of the balls or the columns comprises N elastic layers which are perpendicular to an extending direction or have components along the extending direction; a surface of a portion where the elastic layers intersect with each other is an active surface, a surface of a portion without intersection is integrated with the balls or the columns; each of the balls or the columns further comprises no less than N forming parts, wherein N≥4; a farthest distance between two ends of each of the forming parts along the extending direction is smaller than a largest length of the balls or the columns along the extending direction.

Preferably, an area or multiple areas of the elastic layers have a foldable convex part and a foldable concave part, in such a manner that the forming parts at one side of a folded portion have a first convex block and a first concave recess towards at least one direction, and the forming parts at another side of the folded portion have a second concave recess engaged with the first convex block and a second convex block engaged with the first concave recess at corresponding positions; after engagement, some of the forming parts are still dispersed towards a certain direction, and passages with different diameters are arranged on the forming parts dispersed and the forming parts engaged which are contacted and relatively move; a locking part passes though the passages to eliminate relative movement between the forming parts dispersed and the forming parts engaged, in such a manner that there is no dispersed forming parts; the elastic layers are also arranged between the locking part and the passages, which has a folded surface and an elastic buckle instead of a convex and a concave; the elastic buckle is inserted into a buckle slot on a corresponding forming part; the folded surface and the elastic buckle fix the locking part, preventing the locking part from being separated from the balls or the columns; a convex length of the first and second convex blocks along any direction is larger than a thickness of the elastic layers.

Preferably, a wall recess is respectively arranged on the piston and the cylinder, the slide of the cylinder and the recess of the piston are contained in the wall recess; the slide of the cylinder and the recess of the piston are divided into a plurality of strip boards and arc boards with even thicknesses, and external surfaces and internal surfaces of the strip boards and the arc boards are parallel to corresponding surfaces of the wall recess; two ends or a periphery of each of the strip boards and the arc boards has a third convex block which is thinner than the strip boards and the arc boards and extends outwards; a convex height of the third convex block is larger than a thickness of the elastic layers; a side recess is respectively arranged on the piston and an internal wall of the cylinder at a position corresponding to the third convex block, as well as on adjacent strip boards and arc boards corresponding to the third convex block; the side recess surrounds a surface of the third convex block; the elastic layers are also arranged between the strip boards or the arc boards, between the strip boards or the arc boards and the wall recess, and between the strip bards or the arc boards and the side recess.

Preferably, a radius of the recess on the piston and a radius of the slide on the cylinder are 0.0001-0.5 mm smaller than a radius of a corresponding ball or column.

Preferably, a bead recess is drilled at a thick portion of an internal wall of the recess on the piston, for containing a layer of beads; the rolling piston ring is point-contacted or line-contacted with the slide on an internal wall of the cylinder and the beads in the bead recess.

Preferably, when more than a half of the balls or the columns are contained in the recess of the piston or the slide of the cylinder, a side wall at a side of the recess of the piston or the slide of the cylinder is detachable; when a length of a flat bottom slide of the cylinder equals to a length of the cylinder, no side wall of the cylinder is detachable.

The present invention also provides a piston, wherein a rolling piston ring as recited in claim 1 is installed on a head of the piston.

Preferably, a bottom of a recess of the piston has a supply hole and a return hole for lubricating oil; the supply hole and the return hole communicate with a pressure lubricating oil passage.

The present invention also provides a cylinder, wherein a rolling piston ring as recited in claim 1 is installed inside a chamber of the cylinder.

Beneficial effects of the present invention are as follows:
1. The sliding friction of the original piston ring is changed into rolling friction, wherein the friction is greatly reduced, and the efficiency is greatly improved.
2. If heat engine and other machines are damaged during work, wear and tear must the most important factor, and the piston and the cylinder are first worn out. After the friction is greatly reduced, the warranty period is greatly extended and the service life is greatly increased.
3. Improvement is easy, wherein only the piston, the piston ring and the cylinder are changed, while many other components are basically not changed. The friction can be greatly reduced, which means changed part is small and the effect is large.

BRIEF DESCRIPTION OF THE DRAWINGS

FIG. 8.1 is a cross-sectional view of a square isometric column rolling piston ring;
FIG. 8.2 is a cross-sectional view showing assembly of the square isometric column rolling piston ring and the piston;
FIG. 8.3 is a cross-sectional view showing assembly of the square isometric column rolling piston ring, the piston and the cylinder;
FIG. 9.1 is a schematic view of the contact points of the ball ring;
FIG. 9.2 is a schematic diagram of light convex contact points;
FIG. 9.3 is a schematic diagram of heavy convex contact points;
FIG. 9.4 is a schematic view of concave contact points;
FIG. 12.1 is a schematic view of a bead recess;
FIG. 12.2 is a schematic view of a bead shaft and a bead which are not integrated;
FIG. 12.3 is a schematic view of a bead shaft and a bead which are integrated;
FIG. 16.1-FIG. 16.3 are sketch views of long, medium and short columns and three combinations thereof, where a is a long column, b is a middle column, and c is a short column.

Element reference: ball ring 1, contact point 2, contact point surface 3, piston 4, cylinder 5, slide 6, recess 7, bead recess 8, bead 9, bead shaft recess 10, bead shaft 11, interface 12, bead recess outer portion 13, bead recess inner portion 14, wall recess 15, strip board 16, arc board 17, third convex board 18, side recess 19, elastic layer 20, column ring 21.

DETAILED DESCRIPTION OF THE PREFERRED EMBODIMENT

Embodiments will be described in detail herein, examples of which are illustrated in the accompanying drawings. The same numbers in the different figures represent the same or similar elements, unless otherwise indicated. The following embodiments do not represent all embodiments consistent with the present invention.

Instead, they are merely examples of devices consistent with aspects of the present invention as detailed in the appended claims. Various embodiments of the specification are described in a progressive manner.

It should be noted that all directional indications (such as up, down, left, right, front, back, . . . ) in the embodiments of the present invention are only used to explain Relative positional relationship, motion situation and the like of components in a certain posture (as shown in the drawings). If the specific posture changes, the directional indication also changes accordingly.

In addition, the descriptions of "first", "second", and the like in the present invention are used for the purpose of description only, and are not to be construed as indicating or implying their relative importance or implicitly indicating the number of technical features. Thus, features defined with "first" or "second" may include at least one of the features, either explicitly or implicitly. In addition, the technical solutions between the various embodiments may be combined with each other, but must be based on the realization of those skilled in the art, and when the combination of the technical solutions is contradictory or impossible to implement, it should be considered that the combination of the technical solutions does not exist, and such combination is certainly not within the protection scope claimed by the present invention.

Figure 1:
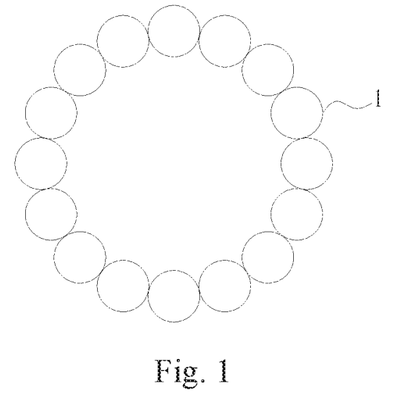
FIG. 1 is a schematic view of a ball ring.

The present invention provides a rolling piston ring installed between a piston and a cylinder, comprising: a plurality of balls 1, wherein the balls are connected end to end to form the rolling piston ring, and a quantity of the balls is no less than three, as shown in FIG. 1; or comprising: a plurality of columns, wherein the columns are connected end to end to form the rolling piston ring, and a quantity of the balls is no less than three; or comprising: balls and columns, wherein the balls and the columns are connected end to end to form the rolling piston ring, and a total quantity of the balls and the columns is no less than three; wherein for solving a sealing problem during rolling, both the balls and the columns are extendable for dealing with thermal expansion and contraction, and/or a recess on the piston for installing the rolling piston ring is extendable and a slide on the cylinder for installing the rolling piston ring is extendable for dealing with thermal expansion and contraction. That is to say, both the balls and the columns are extendable, and/or the recess on the piston for installing the rolling piston ring is extendable and the slide on the cylinder for installing the rolling piston ring is extendable.

A size of the ball is given according to situations. The column is formed by rolling the ball from one point to another in a straight line. Some or all of space that is rolled becomes the column, and ends of the column are hemispheres, which can be convex or concave. For any shape of the piston, a ball ring can be used. Only when an external contour of the piston is partially or completely straight, the ball of the ring corresponding to a straight edge can be replaced with the column, and the ball and the column can be solid or hollow.

Figure 5:
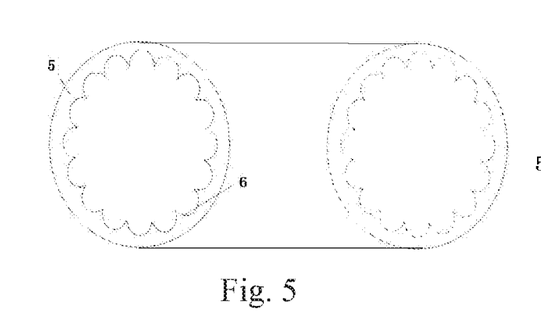
FIG. 5 is a schematic view of a cylinder slide with a circular external contour.
Figure 6:
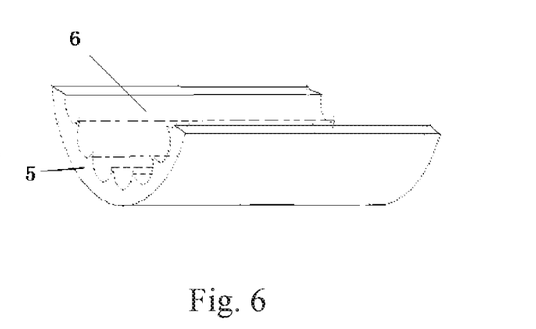
FIG. 6 is a half cross-sectional view of FIG. 5.
Figure 7:
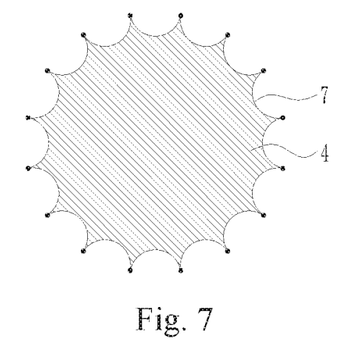
FIG. 7 is a cross-sectional view of a spherical recess on the piston.

An inner side of the ball or column on the rolling ring rolls in a spherical recess or cylindrical recess on the piston (as shown in FIG. 7 and FIG. 8.2), and an outer side rolls in a radially circular slide (as shown in FIGS. 5-6) or a slide with arc ends and a flat bottom (as shown in FIG. 8.3) on an internal wall of the cylinder. The recess of the piston, the rolling ring, and the slide are fitted together, and the ball or column on the rolling ring can both in-situ roll in the recess of the piston and reciprocate in the slide of the internal wall of the cylinder, so as to seal the piston and the cylinder. A length of the slide on the internal wall of the cylinder is no more than a length of the cylinder, and no less than a stroke of the piston (the length from top dead center to bottom dead center).

A radius of each spherical recess on the piston is constant, a quantity of sidewall portions of the spherical recess (outer edge shape) is variable, and a cross-sectional size of the piston is variable. When it becomes larger, it must not exceed an interface between the piston and the cylinder. The interface between the piston and cylinder should meet boundary conditions.

Figure 2:
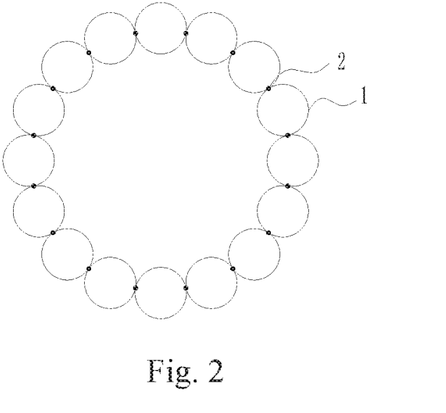
FIG. 2 is a schematic view of contact points of adjacent balls on the ball ring.
Figure 3:
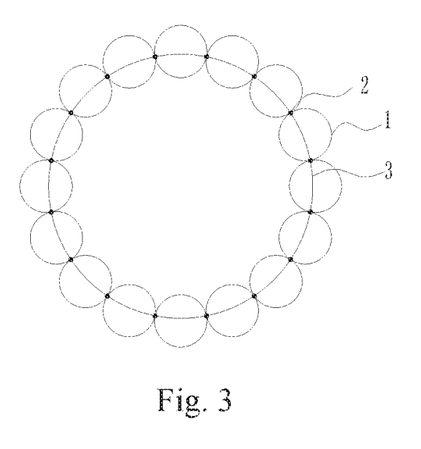
FIG. 3 is a schematic view of the ball ring and the contact points.
Figure 4:
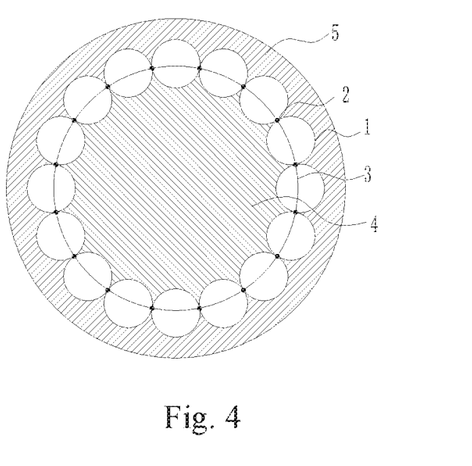
FIG. 4 is a schematic view showing assembly of a piston, a rolling ring and a cylinder.

The boundary conditions: an external counter line of a radial cross section of the rolling ring is larger than a largest radial cross section of the piston, and an internal counter line of the radial cross section of the rolling ring is smaller than a cross section of the inner wall of the cylinder; a contact point 2 of adjacent balls or columns is a boundary point between the piston and the cylinder. A face inside the ball (or column), which connects adjacent contact points of the balls (or columns) and is parallel to an axial direction of the piston, is called a contact point face. A part of the contact point face that extends beyond the ball or column is the interface between the piston and the cylinder, as shown in FIGS. 2-4.

The boundary conditions include the following specific content:

1. a radius of the spherical (or cylindrical) recess on the piston and a radius of the spherical (or cylindrical) slide on the cylinder are 0.0001-0.5 mm smaller than a radius of a corresponding ball (or column). Due to rolling piston ring or the recess of the piston and the slide are extendable, so the radius of the recess and the radius of the slide are smaller than the radius of the ball (or column) at a corresponding position of the ring, so that the ball and the column that are initially installed have a certain preload, preventing gas and oil leakage because of cold.

Figure 10:
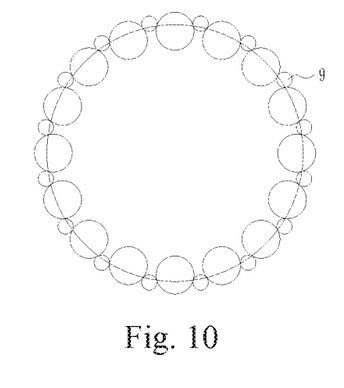
FIG. 10 is a schematic view of outer small balls spacing large balls, for moving the contact points outwards.
Figure 11:
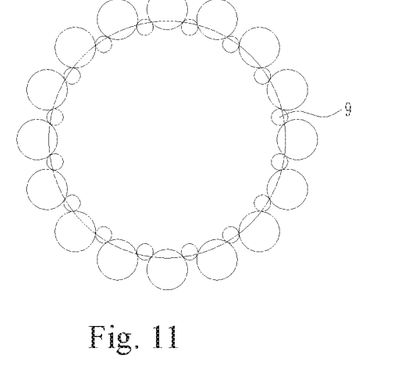
FIG. 11 is a schematic view of inner small balls spacing the large balls, for moving the contact points inwards.

2. If the cross section of the piston needs to be increased, the contact point face can be convex. Also, smaller balls can be used between the original balls to separate at an external side, so as to move the contact point face outwards. Both methods can be used at the same time, and vice versa. Referring to FIGS. 9.1-9.4, FIG. 9.1 is a schematic view of the contact points of the ball ring; FIG. 9.2 is a schematic diagram of light convex contact points; FIG. 9.3 is a schematic diagram of heavy convex contact points; and FIG. 9.4 is a schematic view of concave contact points. FIG. 10 is a schematic view of outer small balls spacing large balls, for moving the contact points outwards and increasing a piston area; FIG. 11 is a schematic view of inner small balls spacing the large balls, for moving the contact points inwards and decrease the piston area. In order to make a rolling effect better, a plurality of bead recesses 8 are drilled at a thick portion of an internal wall of the recess 7 on the piston, for containing beads 9; the beads 9 are point-contacted or line-contacted with the rolling ring and the slide 6 on the internal wall of the cylinder, which further reduces friction, as shown in FIGS. 10 and 11. A bead shaft recess 10 is opened in the bead recess 8, and the bead 9 has a bead shaft 11 mounted in bead recess 8 of the bead shaft 11. The bead 9 does not contact with the bead recess 8 and rotates around the bead shaft 11. The bead shaft 11 can be integrally formed with the bead 9, or the bead shaft 11 is individually made and installed on the bead 9, as shown in FIG. 12.1 to FIG. 12.3.

Figure 121:
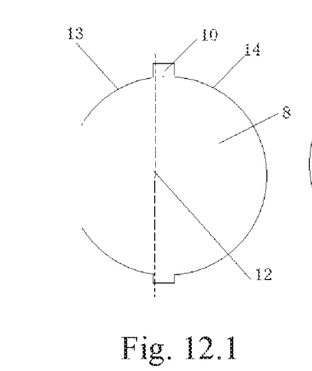
Figure 122:
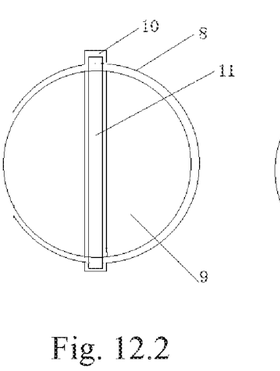
Figure 123:
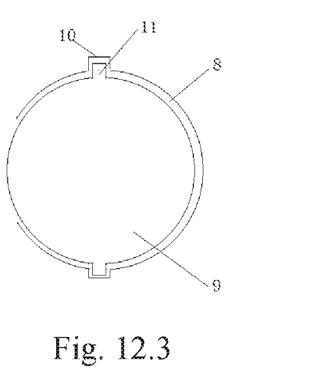

3. When more than a half of the balls (or the columns) are contained in the recess 7 of the piston (or the slide 6 of the cylinder), for putting the ring in to the recess 7 (or the slide 6), a side wall at a side of the recess 7 of the piston (or the slide 6 of the cylinder) is detachable, and is fixed by screws or clamps or pins. In order to fit the bead into the bead recess, the bead recess 8 is divided into a bead recess outer portion 13 and a bead recess inner portion 14 through an interface 12, wherein the bead recess outer portion 13 is detachably installed on the bead recess inner portion 14, and the bead recess outer portion 13 can be integrated or separated, as shown in FIG. 12.1. If a length of a flat bottom slide (radial arc-shaped, axial non-circular slide) of the cylinder equals to a length of the cylinder, no side wall of the cylinder needs to be detachable.

In order to increase an effective thrust area ratio of a top surface of the piston, the piston cross section may be similar to a shape of a combustion chamber, and an external contour of the piston is consistent with a degree of bending of the internal wall of the cylinder.

During working, a temperature of the rolling piston ring changes greatly, and thermal expansion and contraction are obvious. The balls and columns on the rolling ring must be stretched and contracted during thermal expansion and contraction to prevent gas leakage and oil leakage when a volume is contracted, and also prevent swelling when the volume expands. In order to solve such problems, the present invention adopts an extendable rolling ring, or the recess on the piston and the slide on the cylinder are extendable.

(1) In order to have three-dimensional or multi-dimensional extending function for the balls and columns on the rolling ring, a structure of the ball and the column must conform to the following expansion and contraction conditions.

Expansion and contraction conditions: each of the balls or the columns comprises N elastic layers which are perpendicular to an extending direction or have components along the extending direction; a surface of a portion where the elastic layers intersect with each other is an active surface, a surface of a portion without intersection is integrated with the balls or the columns; the ball or the column is formed by a plurality of forming parts, like a commercially available Luban ball (or column); each of the balls or the columns further comprises no less than N forming parts, wherein N≥4; a farthest distance between two ends of each of the forming parts along the extending direction is smaller than a largest length of the balls or the columns along the extending direction (if not, the ball or column will be pushed by the forming parts and unable to expand and contract).

Since a mechanical strength of the elastic layer is small, in order to prevent the ball and the column from being scattered under strong extrusion, the structure of the extendable ball and column is to comply with the following strength conditions.

Strength conditions: an area or multiple areas of the elastic layers have a foldable convex part and a foldable concave part, in such a manner that the forming parts at one side of a folded portion have a first convex block and a first concave recess towards at least one direction, and the forming parts at another side of the folded portion have a second concave recess engaged with the first convex block and a second convex block engaged with the first concave recess at corresponding positions; after engagement, some of the forming parts are still dispersed towards a certain direction, and passages with different diameters are arranged on the forming parts dispersed and the forming parts engaged which are contacted and relatively move; a locking part passes though the passages to eliminate relative movement between the forming parts dispersed and the forming parts engaged, in such a manner that there is no dispersed forming parts; the elastic layers are also arranged between the locking part and the passages, which has a folded surface and an elastic buckle instead of a convex and a concave; the elastic buckle is inserted into a buckle slot on a corresponding forming part; the folded surface and the elastic buckle fix the locking part, preventing the locking part from being separated from the balls or the columns; a convex length of the first and second convex blocks along any direction is larger than a thickness of the elastic layers.

The extendable ball or column has a structure similar to those of the Luban ball (or column) and a spherical or cylindrical Kongming lock. The ball or column contains faces in no less than N directions, and the faces are interspersed and engaged by the holes, the folded faces, the convex blocks, the concave recesses and the like, so as not to be dispersed. Differences are that two faces that are in contact with each other are cut off by a thin layer (a thickness of the thin layer is generally between 0.001 mm-4 mm), and replaced by the elastic layer. The elastic buckle is provided at an end of a last locking member, and the buckle slot is provided on the corresponding forming part, thereby further preventing the ball or the column from being dispersed, and conforming that a farthest distance between two ends of each of the forming parts along the extending direction is smaller than a largest length of the balls or the columns along the extending direction and a convex height of the face is larger than a thickness of the elastic layers.

(2) Wear-resistant layers of the slide of the cylinder and the recess of the piston are extendable through a special structure.

Figure 13:
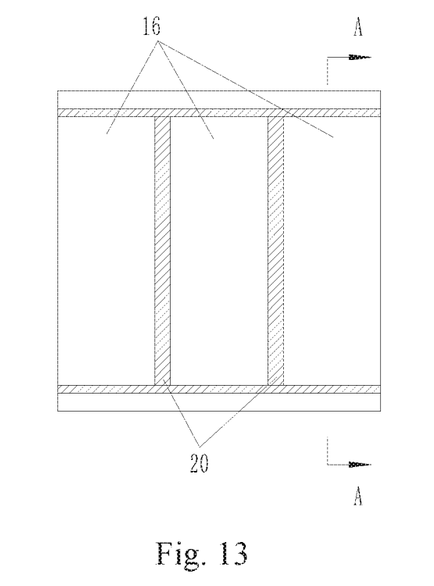
FIG. 13 is a cross-sectional view showing dividing a slide and a recess into strip boards.
Figures 14, 15:
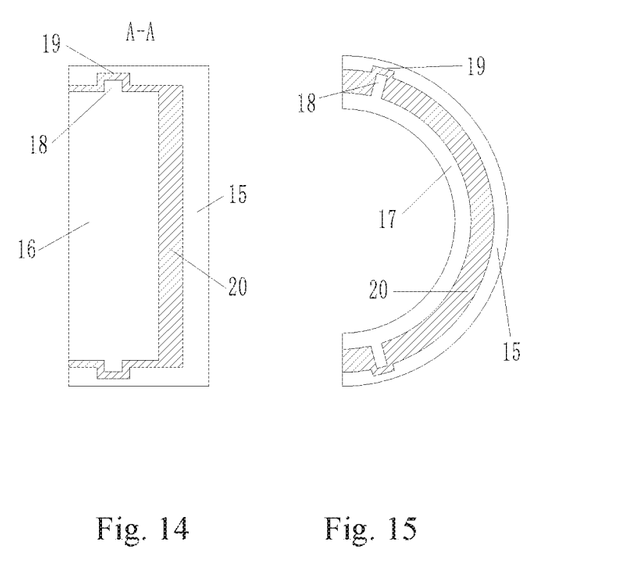
FIG. 14 is an A-A cross-sectional view of FIG. 13.
FIG. 15 is a cross-sectional view showing dividing the slide and the recess into arc boards.

Referring to FIGS. 13-15, a wall recess 15 is respectively arranged on the piston and the cylinder, the slide 6 of the cylinder and the recess 7 of the piston are contained in the wall recess 15; the slide 6 of the cylinder and the recess 7 of the piston are divided into a plurality of strip boards 16 and arc boards 17 with even thicknesses, and external surfaces and internal surfaces of the strip boards 16 and the arc boards 17 are parallel to corresponding surfaces of the wall recess 15; two ends or a periphery of each of the strip boards 16 and the arc boards 17 has a third convex block 18 which is thinner than the strip boards 16 and the arc boards 17 and extends outwards; a convex height of the third convex block 18 is larger than a thickness of the elastic layers; a side recess 19 is respectively arranged on the piston and an internal wall of the cylinder at a position corresponding to the third convex block 18, as well as on adjacent strip boards 16 and arc boards 17 corresponding to the third convex block 18; the side recess 19 surrounds a surface of the third convex block 18; the elastic layers are also arranged between the strip boards 16 or the arc boards 17, between the strip boards 16 or the arc boards 17 and the wall recess 15, and between the strip bards 16 or the arc boards 17 and the side recess 19.

The ball and the column in a ball-column ring can be adjusted according to the temperature change of the rolling piston ring. The rolling ring may be extendable, the slide and the recess may be extendable, or all of them or none of them may be extendable.

When the rolling piston ring provided by the present invention is applied to a conventional heat engine, sizes and shapes of other parts of the heat engine are substantially unchanged, and only the shape of the cylinder, the piston and the piston ring are changed, in such a manner that the piston ring rolls between and seals the piston and the cylinder, which reduces friction, reduces useless work of an internal combustion engine, saves energy, and can increase efficiency and power of the internal combustion engine by more than 5%.

The present invention also provides a piston and a cylinder, the rolling piston ring of the present invention is installed between the piston and the cylinder, wherein a bottom of a recess of the piston has a supply hole and a return hole for lubricating oil; the supply hole and the return hole communicate with a pressure lubricating oil passage, so as to provide lubrication and recovery lubricant for the rolling ring. The piston, the rolling piston ring and the cylinder are assembled into a cylinder assembly, which can be used for steam engines and reciprocating impact devices such as single and double cycle internal combustion engines, slurry pumps or hydraulic cylinders, cylinders and excavators, shearers, roadheaders or loaders, for converting sliding friction between reciprocating parts and supporting parts into rolling friction.

Specifically, when the rolling piston ring is used for a "double-cycle internal combustion steam engine" having a piston rod, a slide can be made on the piston rod, and a spherical or cylindrical recess can be formed on the lower cylinder head, wherein the piston ring is arranged between the slide and the recess. The rolling ring in-situ rolls in the recess of the lower cylinder head and reciprocate on the slide of the piston rod. The recess of the lower cylinder head, the rolling ring and the slide of the piston rod are fitted for sealing the piston rod and the lower cylinder head.

Embodiment 1

FIGS. 4-7 show a piston 4 with a circular external contour, a piston ring which is a ball ring 1, a cylinder 5, a recess-shaped slide 6 formed by a plurality of arc in a radical direction and a plurality of partially cylindrical face in an axial direction, and a spherical recess 7 on the piston 4. The ball ring 1, the slide 6 and the recess 7 are fitted together. The ball ring 1 can in-situ roll in the recess 7 of the piston 4, as well as reciprocate on the slide 6 on an internal wall of the cylinder 5, so as to seal the circular piston 4 and the circular cylinder 5.

When an outer diameter of the circular cylinder 5 is constant and a thickness of the cylinder 5 is slightly changed, original balls can be separated on an outer side by small ball, for moving contact points outwards. Furthermore, moving a contact point face outwards can increase a cross section of the piston 4, and vice versa. The cross section of the piston 4 is greatly changed by changing the rolling piston ring and changing a volume of the rolling piston ring contained in the recess 7 of the piston 4.

Embodiment 2

Figure 81:
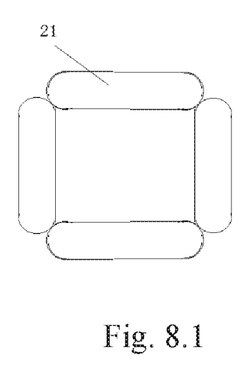
Figure 82:
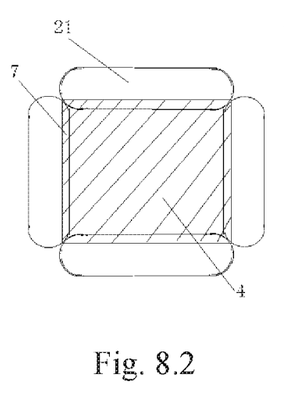
Figure 83:
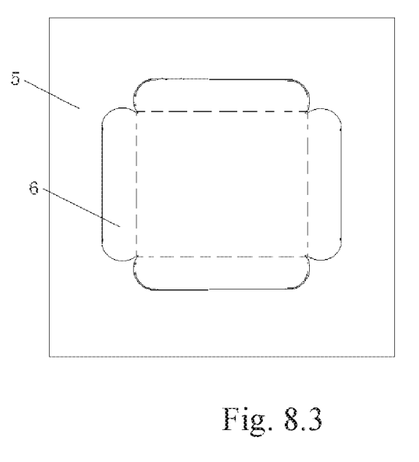
Figure 91:
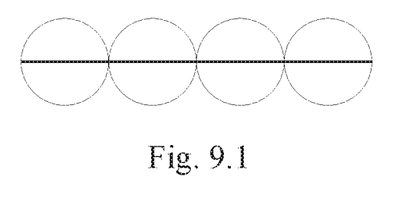
Figure 92:
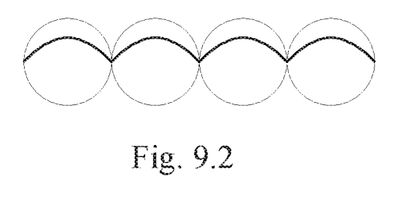
Figure 93:
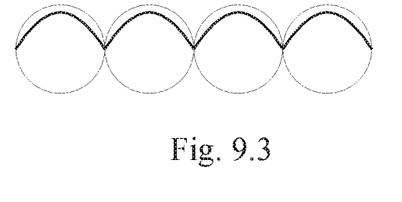
Figure 94:
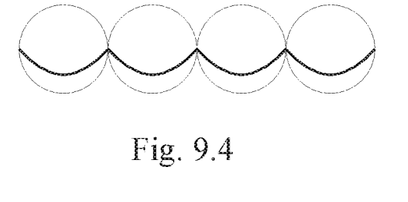

FIGS. 8.1-8.3 show a piston 4 with a square external contour, a piston ring which is a column ring 21, a square cylinder 5, a flat-bottom slide 6 on an internal wall of the cylinder with arcs at two ends, and a column recess 7 with two convex ends on the piston 4. The column ring 21, the slide 6 and the column recess 7 are fitted together. The column ring 21 can in-situ roll in the recess 7, as well as reciprocate on the slide 6 on the internal wall of the cylinder 5, so as to seal the piston 4 and the cylinder 5.

Figure 161:
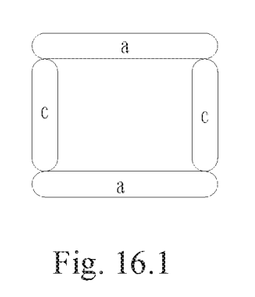
Figure 162:
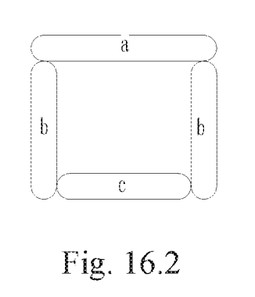
Figure 163:
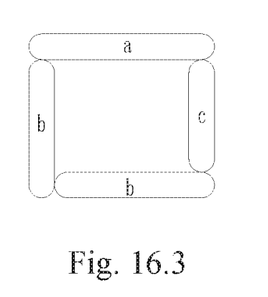

Referring to FIGS. 16.1-16.3, The cross section of the piston is square, and the column on each side of the column ring may be integrated, wherein a length and a thickness of each column may be equal or unequal. If the length is not equal, there may be three kinds of columns with long, medium and short lengths (a, b, c respectively). The maximum length difference between the long and the middle columns or the middle and the short columns equals to a diameter of the cross section of the column. When the lengths are not equal, combinations of rolling columns can be arranged in a clockwise order: long-short-long-short, or long-medium-short-medium, or long-short-medium-medium and the like. In order to reduce wear of the contact points of adjacent columns, the axes of the adjacent columns may be misaligned (an extension line of one column axis is not on a center of an end hemisphere of another column), wherein being misaligned provides an eccentric amount, so that the wear point keeps changing, thereby reducing the wear. Alternatively, a connecting line of centers of convex hemispheres of the adjacent columns is not perpendicular to the column axis, so that the wear point keeps changing, thereby reducing the wear. Alternatively, the contact point is where angular velocities of the adjacent column hemispheres (or linear velocities) are the same, so that a relative speed of the contact point is close to zero to reduce wear.

Embodiment 3

The cross-sectional shape of the piston, the shape of the rolling ring, the overall shape of the cylinder internal contour and the shape of the cylinder head are consistent or nearly identical to the cross-sectional shape of the combustion chamber, and the rolling ring, the recess of the piston, the slide on the internal wall of the cylinder are fitted, so as to seal the piston and the cylinder.

Since the conventional piston ring of the internal combustion engine is circular, the internal contour of the cylinder and the external contour of the piston are both circular, which is not matched with the combustion chamber of a non-circular cross section. A part of the piston is not subject to the gas thrust, resulting in large mass and inertia of the cylinder and the piston. Nowadays, the rolling ring of the present invention may be non-circular, which can change the shape of the cross section of the piston so as to correspond to the cross-sectional shape of the combustion chamber, thereby increasing a proportion of an effective area of a gas thrust of a power stroke in a total area, and reducing weights of the piston and the cylinder.

One skilled in the art will understand that the embodiment of the present invention as shown in the drawings and described above is exemplary only and not intended to be limiting. Therefore, this invention includes all modifications encompassed within the spirit and scope of the following claims.

What is claimed is:

1. A rolling piston ring installed between a piston and a cylinder, comprising: a plurality of balls, wherein the balls are connected end to end to form the rolling piston ring, and a quantity of the balls is no less than three; or comprising: a plurality of columns, wherein the columns are connected end to end to form the rolling piston ring, and a quantity of the columns is no less than three; or comprising: balls and columns, wherein the balls and the columns are connected end to end to form the rolling piston ring, and a total quantity of the balls and the columns is no less than three; wherein a plurality of recesses on the piston and a plurality of slides on the cylinder are there for installing the rolling piston in one of the plurality of recesses and a corresponding one of the plurality of slides; wherein each of the plurality of recesses and the slides are elongated, and the rolling piston ring is one of a plurality of rolling piston rings;

wherein each of the balls or the columns comprises N elastic layers which are perpendicular to an extending direction or have components along the extending direction; a surface of a portion where the elastic layers intersect with each other is an active surface, a surface of a portion without intersection is integrated with the balls or the columns; each of the balls or the columns further comprises no less than N forming parts, wherein $N \geq 4$; a farthest distance between two ends of each of the forming parts along the extending direction is smaller than a largest length of the balls or the columns along the extending direction.

2. The rolling piston ring, as in claim 1, wherein a wall recess is respectively arranged on the piston and the cylinder, the slide of the cylinder and the recess of the piston are contained in the wall recess; the slide of the cylinder and the recess of the piston are divided into a plurality of strip boards and arc boards with even thicknesses, and external surfaces and internal surfaces of the strip boards and the arc boards are parallel to corresponding surfaces of the wall recess; two ends or a periphery of each of the strip boards and the arc boards has a third convex block which is thinner than the strip boards and the arc boards and extends outwards; a convex height of the third convex block is larger than a thickness of the elastic layers; a side recess is respectively arranged on the piston and an internal wall of the cylinder at a position corresponding to the third convex block, as well as on adjacent strip boards and arc boards corresponding to the third convex block; the side recess surrounds a surface of the third convex block; the elastic layers are also arranged between the strip boards or the arc boards, between the strip boards or the arc boards and the wall recess, and between the strip boards or the arc boards and the side recess.

3. The rolling piston ring, as in claim 1, wherein a radius of the recess on the piston and a radius of the slide on the cylinder are 0.0001-0.5 mm smaller than a radius of a corresponding ball or column.

4. The rolling piston ring, as in claim 1, wherein a bead recess is drilled at a thick portion of an internal wall of the recess on the piston, for containing a layer of beads; the rolling piston ring is point-contacted or line-contacted with the slide on an internal wall of the cylinder and the beads in the bead recess.

5. The rolling piston ring, as in claim 1, is installed on a head of the piston.

* * * * *